United States Patent
Savard et al.

(10) Patent No.: US 7,826,383 B2
(45) Date of Patent: Nov. 2, 2010

(54) HOME PHONELINE NETWORK ALLIANCE RESPONDER FOR IPTV INSTALLATIONS

(75) Inventors: Jason Savard, San Antonio, TX (US);
Paul Whitehead, Boerne, TX (US);
Nathan Edwards, Lewisville, TX (US)

(73) Assignee: AT&T Intellectual Property I, LP, Reno, NV (US)

( * ) Notice: Subject to any disclaimer, the term of this patent is extended or adjusted under 35 U.S.C. 154(b) by 254 days.

(21) Appl. No.: 11/963,137

(22) Filed: Dec. 21, 2007

(65) Prior Publication Data

US 2009/0161550 A1 Jun. 25, 2009

(51) Int. Cl.
*H04J 1/16* (2006.01)
(52) U.S. Cl. .................................. 370/249; 370/241
(58) Field of Classification Search .......... 370/241–253
See application file for complete search history.

(56) References Cited

U.S. PATENT DOCUMENTS

| | | | |
|---|---|---|---|
| 5,073,976 A * | 12/1991 | Kennedy ................ 455/161.3 |
| 6,359,863 B1 * | 3/2002 | Varma et al. ............... 370/232 |
| 6,775,240 B1 * | 8/2004 | Zhang et al. ............... 370/251 |
| 7,003,098 B2 * | 2/2006 | Smith .................... 379/406.02 |
| 7,142,563 B1 | 11/2006 | Lin |
| 7,180,855 B1 | 2/2007 | Lin |
| 7,280,484 B1 | 10/2007 | Chow et al. |
| 2003/0091021 A1 * | 5/2003 | Trossen et al. ............. 370/349 |
| 2003/0132757 A1 * | 7/2003 | Fernandez ................. 324/539 |
| 2003/0147523 A1 | 8/2003 | Watson et al. |
| 2007/0195707 A1 * | 8/2007 | Cidon et al. ............... 370/252 |
| 2007/0258383 A1 * | 11/2007 | Wada ........................ 370/252 |
| 2008/0198754 A1 * | 8/2008 | Savoor et al. .............. 370/245 |
| 2009/0196189 A1 * | 8/2009 | Ostrup et al. .............. 370/252 |

OTHER PUBLICATIONS

Baccala, Brent. Connected: An Internet Encyclopedia. <http://web.archive.org/web/20030625010652/http://www.freesoft.org/CIE/Topics/53.htm>. Jun. 25 2003.*
A. Dacey. How ARP Works. <http://web.archive.org/web/20061215012704/www.tildefrugal.net/tech/arp.php>. Dec. 15, 2006.*
Wikipedia. HomePNA. <http://web.archive.org/web/20060901223029/http://en.wikipedia.org/wiki/HomePNA>. Sep. 1, 2006.*
HomePNA.org. HomePNA & Sunrise Telecom. Jun. 2007. <http://www.homepna.org/learn/success_stories/HomePNA_Sunrise_Telecom.pdf>.*

* cited by examiner

*Primary Examiner*—William Trost, IV
*Assistant Examiner*—Ashil Farahmand
(74) *Attorney, Agent, or Firm*—Larson Newman & Abel, LLP

(57) ABSTRACT

A device for testing a home phoneline network alliance performance of a local network is disclosed. The device includes a first network interface, a second network interface, a test module, and a processor. The first network interface is adapted to connect with the local network through a first type of cable. The second network interface is adapted to connect with the local network through a second type of cable. The test module is connected to the first network interface and to the second network interface, the test module is adapted to receive a test signal transmitted over a cable in the local network. The processor is connected to the test module and is adapted to execute a plurality of program instructions to determine a signal quality for the test signal received over the cable and to output a performance result signal for the cable in the local network based on the signal quality.

14 Claims, 4 Drawing Sheets

HOME PHONELINE NETWORK ALLIANCE RESPONDER FOR IPTV INSTALLATIONS

FIELD OF THE DISCLOSURE

The present disclosure generally relates to communications networks, and more particularly relates to Home Phoneline Network Alliance (HPNA) networks.

BACKGROUND

Broadband data connections to the home, such as digital subscriber lines (DSL) and cable modems, are increasingly ubiquitous. Broadband connections provide high speed Internet connectivity to the home, and have led to what is sometimes referred to as "home networking." Generally, home networking refers to technologies that allow for the interconnection of computing and electronics devices in the home. The demand for such interconnectivity is due, at least in part, to the desire to interconnect multiple computers and share a single broadband connection, as well as other network resources such as printers, scanners, etc. Several different technologies have been proposed for implementing home networks. These include, for example, conventional Ethernet networks, wireless networks, and power line networks.

One home networking technology that has gained recognition is that designed by the Home Phoneline Network Alliance (HPNA). Generally, the HPNA specification employs existing twisted pair telephone wires or Coax wires in the home to connect computing devices at data rates approaching 128 Mbits per second. Future HPNA specifications include data rates that reach and eventually exceed 320 Mbps. An HPNA network uses frequency division multiplexing to transmit home network data traffic on the same twisted wire pairs that simultaneously are used to transmit non-HPNA signals such as telephone and DSL signals. HPNA transmits in the 4 MHz to 28 MHz frequency range, as compared to telephone traffic that typically transmits in the 15 HZ to 4 KHz range, and ADSL/VDSL that typically transmits in the 25 KHz to 8.5 MHz range.

BRIEF DESCRIPTION OF THE DRAWINGS

It will be appreciated that for simplicity and clarity of illustration, elements illustrated in the Figures have not necessarily been drawn to scale. For example, the dimensions of some of the elements are exaggerated relative to other elements. Embodiments incorporating teachings of the present disclosure are shown and described with respect to the drawings presented herein, in which.

The use of the same reference symbols in different drawings indicates similar or identical items.

DETAILED DESCRIPTION OF THE DRAWINGS

The numerous innovative teachings of the present application will be described with particular reference to the presently preferred exemplary embodiments. However, it should be understood that this class of embodiments provides only a few examples of the many advantageous uses of the innovative teachings herein. In general, statements made in the specification of the present application do not necessarily delimit any of the various claimed inventions. Moreover, some statements may apply to some inventive features but not to others.

Figure 1:
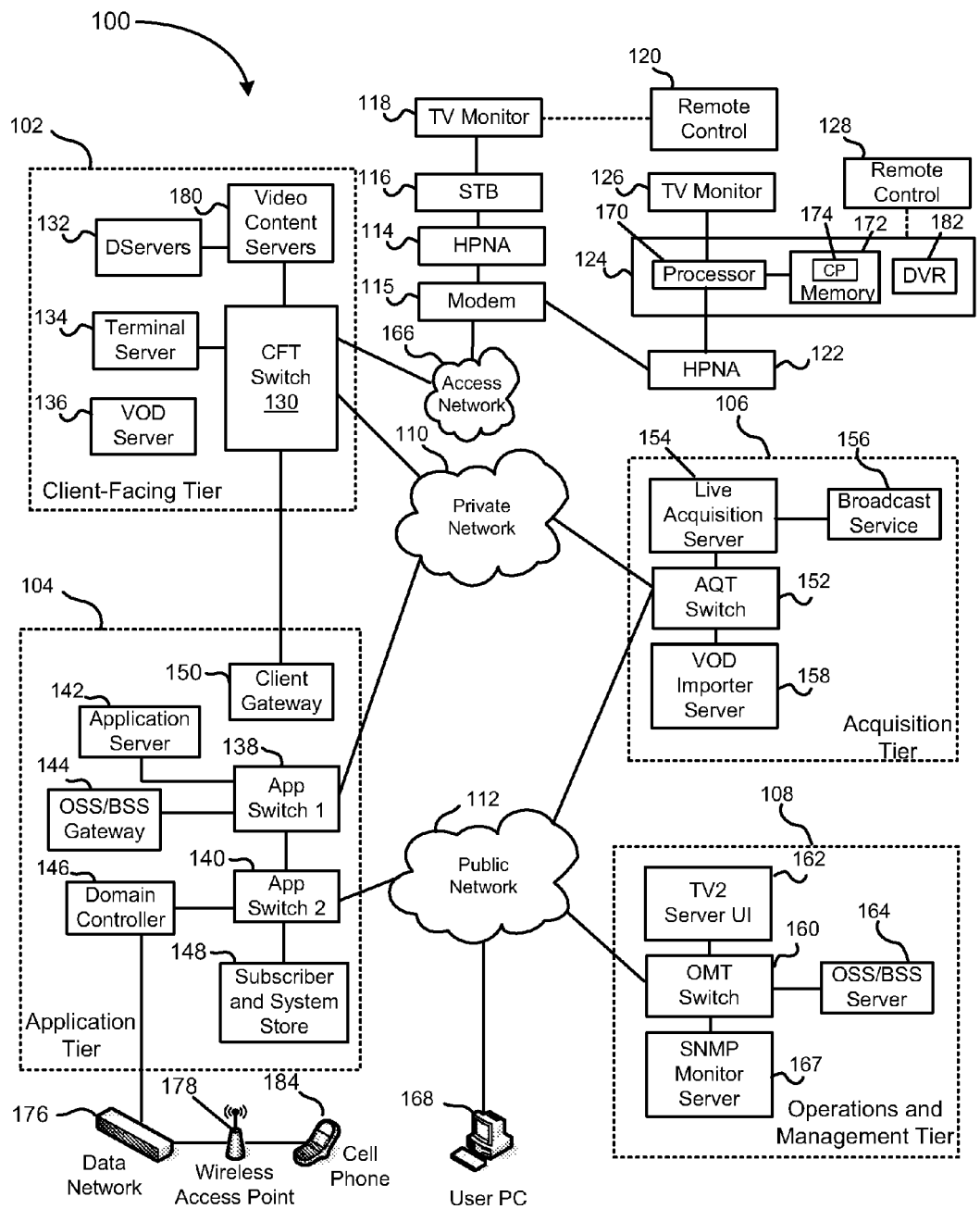
FIG. 1 is a block diagram illustrating an Internet Protocol Television (IPTV) network in accordance with one embodiment of the present disclosure.

FIG. 1 shows an IPTV system 100 including a client facing tier 102, an application tier 104, an acquisition tier 106, and an operations and management tier 108. Each tier 102, 104, 106, and 108 is coupled to one or both of a private network 110 and a public network 112. For example, the client-facing tier 102 can be coupled to the private network 110, while the application tier 104 can be coupled to the private network 110 and to the public network 112 such as the Internet. The acquisition tier 106 can also be coupled to the private network 110 and to the public network 112. Moreover, the operations and management tier 108 can be coupled to the public network 112.

The various tiers 102, 104, 106 and 108 communicate with each other via the private network 110 and the public network 112. For instance, the client-facing tier 102 can communicate with the application tier 104 and the acquisition tier 106 via the private network 110. The application tier 104 can also communicate with the acquisition tier 106 via the private network 110. Further, the application tier 104 can communicate with the acquisition tier 106 and the operations and management tier 108 via the public network 112. Moreover, the acquisition tier 106 can communicate with the operations and management tier 108 via the public network 112. In a particular embodiment, elements of the application tier 104 can communicate directly with the client-facing tier 102.

The client-facing tier 102 can communicate with user equipment via a private access network 166, such as an Internet Protocol Television (IPTV) network. In an illustrative embodiment, modem 115 can be coupled to the private access network 166. The client-facing tier 102 can communicate with a first representative set-top box (STB) device 116 via the modem 115 and HPNA connector 114 and with a second representative set-top box device 124 via the second HPNA connector 122. The client-facing tier 102 can communicate with a large number of set-top boxes over a wide geographic area, such as a regional area, a metropolitan area, a viewing area, or any other suitable geographic area that can be supported by networking the client-facing tier 102 to numerous set-top box devices. In one embodiment, the client-facing tier 102 can be coupled to the modem 115 via fiber optic cables. Alternatively, the modem 115 can be digital subscriber line (DSL) modem that is coupled to one or more network nodes via twisted pairs, and the client-facing tier 102 can be coupled to the network nodes via fiber-optic cables. Each set-top box device 116 and 124 can process data received from the private access network 166 via an IPTV software platform such as Microsoft® Mediaroom IPTV.

The first set-top box device 116 can be coupled to a first display device 118, such as a first television monitor, and the second set-top box device 124 can be coupled to a second display device 126, such as a second television monitor. Moreover, the first set-top box device 116 can communicate with a first remote control 120, and the second set-top box device can communicate with a second remote control 128. In an exemplary, non-limiting embodiment, each set-top box device 116 and 124 can receive data or video from the client-facing tier 102 via the private access network 166 and render or display the data or video at the display device 118 or 126 to which it is coupled. The set-top box devices 116 and 124 thus may include System on a Chips (SoC) that receive and decode television programming information for transmission to the display devices 118 and 126. Further, the set-top box devices 116 and 124 can include an STB processor 170 and an STB memory device 172 that is accessible to the STB processor. In a particular embodiment, the set-top box devices 116 and 124 can also communicate commands received from the remote controls 120 and 128 back to the client-facing tier 102 via the private access network 166.

In an illustrative embodiment, the client-facing tier 102 can include a client-facing tier (CFT) switch 130 that manages communication between the client-facing tier 102 and the private access network 166 and between the client-facing tier 102 and the private network 110. As shown, the CFT switch 130 is coupled to one or more data servers 132 that store data transmitted in response to user requests, such as video-on-demand material. The CFT switch 130 can also be coupled to a terminal server 134 that provides terminal devices, such as a game application server and other devices with a common connection point to the private network 110. In a particular embodiment, the CFT switch 130 can also be coupled to a video-on-demand (VOD) server 136.

The application tier 104 can communicate with both the private network 110 and the public network 112. In this embodiment, the application tier 104 can include a first application tier (APP) switch 138 and a second APP switch 140. In a particular embodiment, the first APP switch 138 can be coupled to the second APP switch 140. The first APP switch 138 can be coupled to an application server 142 and to an OSS/BSS gateway 144. The application server 142 provides applications to the set-top box devices 116 and 124 via the private access network 166, so the set-top box devices 116 and 124 can provide functions such as display, messaging, processing of IPTV data and VOD material. In a particular embodiment, the OSS/BSS gateway 144 includes operation systems and support (OSS) data, as well as billing systems and support (BSS) data.

The second APP switch 140 can be coupled to a domain controller 146 that provides web access, for example, to users via the public network 112. The second APP switch 140 can be coupled to a subscriber and system store 148 that includes account information, such as account information that is associated with users who access the system 100 via the private network 110 or the public network 112. In a particular embodiment, the application tier 104 can also include a client gateway 150 that communicates data directly to the client-facing tier 102. In this embodiment, the client gateway 150 can be coupled directly to the CFT switch 130. The client gateway 150 can provide user access to the private network 110 and the tiers coupled thereto.

In a particular embodiment, the set-top box devices 116 and 124 can access the system via the private access network 166 using information received from the client gateway 150. The private access network 166 provides security for the private network 110. User devices can access the client gateway 150 via the private access network 166, and the client gateway 150 can allow such devices to access the private network 110 once the devices are authenticated or verified. Similarly, the client gateway 150 can prevent unauthorized devices, such as hacker computers or stolen set-top box devices, from accessing the private network 110 by denying access to these devices beyond the private access network 166.

For example, when the set-top box device 116 accesses the system 100 via the private access network 166, the client gateway 150 can verify subscriber information by communicating with the subscriber and system store 148 via the private network 110, the first APP switch 138 and the second APP switch 140. Further, the client gateway 150 can verify billing information and status by communicating with the OSS/BSS gateway 144 via the private network 110 and the first APP switch 138. The OSS/BSS gateway 144 can transmit a query across the first APP switch 138, to the second APP switch 140, and the second APP switch 140 can communicate the query across the public network 112 to the OSS/BSS server 164. After the client gateway 150 confirms subscriber and/or billing information, the client gateway 150 can allow the set-top box device 116 access to IPTV content and VOD content. If the client gateway 150 cannot verify subscriber information for the set-top box device 116, such as because it is connected to a different twisted pair, the client gateway 150 can deny transmissions to and from the set-top box device 116 beyond the private access network 166.

The acquisition tier 106 includes an acquisition tier (AQT) switch 152 that communicates with the private network 110. The AQT switch 152 can also communicate with the operations and management tier 108 via the public network 112. In a particular embodiment, the AQT switch 152 can be coupled to a live acquisition server 154 that receives television content, for example, from a broadcast service 156. Further, the AQT switch can be coupled to a video-on-demand importer server 158 that stores television content received at the acquisition tier 106 and communicate the stored content to the client-facing tier 102 via the private network 110.

The operations and management tier 108 can include an operations and management tier (OMT) switch 160 that conducts communication between the operations and management tier 108 and the public network 112. In the illustrated embodiment, the OMT switch 160 is coupled to a TV2 server 162. Additionally, the OMT switch 160 can be coupled to an OSS/BSS server 164 and to a simple network management protocol (SNMP) monitor 167 that monitors network devices. In a particular embodiment, the OMT switch 160 can communicate with the AQT switch 152 via the public network 112.

In a particular embodiment during operation of the IPTV system, the live acquisition server 154 can acquire television content from the broadcast service 156. The live acquisition server 154 in turn can transmit the television content to the AQT switch 152 and the AQT switch can transmit the television content to the CFT switch 130 via the private network 110. Further, the television content can be encoded at the Live Acquisition Server 154, and the CFT switch 130 can communicate the television content to the modem 115 via the private access network 166. The set-top box devices 116 and 124 can receive the television content from the modem 115 and HPNA connectors 114 and 122, decode the television content, and transmit the content to the display devices 118 and 126 according to commands from the remote control devices 120 and 128.

Additionally, at the acquisition tier 106, the VOD importer server 158 can receive content from one or more VOD sources outside the IPTV system 100, such as movie studios and programmers of non-live content. The VOD importer server 158 can transmit the VOD content to the AQT switch 152, and the AQT switch 152 in turn can communicate the material to the CFT switch 130 via the private network 110. The VOD content can be stored at one or more servers, such as the VOD server 136.

When a user issues a request for VOD content to the set-top box device 116 or 124, the request can be transmitted over the private access network 166 to the VOD server 136 via the CFT switch 130. Upon receiving such a request, the VOD server 136 can retrieve requested VOD content and transmit the content to the set-top box device 116 or 124 across the private access network 166 via the CFT switch 130. In an illustrative embodiment, the live acquisition server 154 can transmit the television content to the AQT switch 152, and the AQT switch 152 in turn can transmit the television content to the OMT switch 160 via the public network 112. In this embodiment, the OMT switch 160 can transmit the television content to the TV2 server 162 for display to users accessing the user interface at the TV2 server. For example, a user can access the TV2 server 162 using a personal computer 168 coupled to the public network 112.

The domain controller 146 communicates with the public network 112 via the second APP switch 140. Additionally, the domain controller 146 can communicate via the public network 112 with the personal computer 168. For example, the domain controller 146 can display a web portal via the public network 112 and allow users to access the web portal using the PC 168. Further, in an illustrative embodiment, the domain controller 146 can communicate with at least one wireless network access point 178 over a data network 176. In this embodiment, each wireless network access device 178 can communicate with user wireless devices such as a cellular telephone 184.

In a particular embodiment, the set-top box devices can include an STB computer program 174 that is embedded within the STB memory device 172. The STB computer program 174 can contain instructions to receive and execute at least one user television viewing preference that a user has entered by accessing an Internet user account via the domain controller 146. For example, the user can use the PC 168 to access a web portal maintained by the domain controller 146 via the Internet. The domain controller 146 can query the subscriber and system store 148 via the private network 110 for account information associated with the user. In a particular embodiment, the account information can associate the user's Internet account with the second set-top box device 124. For instance, in an illustrative embodiment, the account information can relate the user's account to the second set-top box device 124 by associating the user account with an IP address of the second set-top box device, with data relating to one or more twisted pairs connected with the second set-top box device, with data related to one or more fiber optic cables connected with the second set-top box device, with an alpha-numeric identifier of the second set-top box device, with any other data that is suitable for associating second set-top box device with a user account, or with any combination of these.

The STB computer program 174 can contain instructions to receive many types of user preferences from the domain controller 146 via the access network 166. For example, the STB computer program 174 can include instructions to receive a request to record at least one television program at a video content storage module such as a digital video recorder (DVR) 182 within the second set-top box device 124. In this example embodiment, the STB computer program 174 can include instructions to transmit the request to the DVR 182, where the television program(s) are recorded. In an illustrative embodiment, the STB computer program 174 can include instructions to receive from the DVR 182 a recording status with respect to one or more of the television programs and to transmit at least one message regarding the status to a wireless device, such as the cellular telephone 184. The message can be received at the CFT switch 130, for instance, and communicated to the domain controller 146 across the private network 110 via the second APP switch 140. Further, the domain controller 146 can transmit the message to the wireless data network 176, directly or via the public network 112, and on to the wireless network access point 178. The message can then be transmitted to the cellular telephone 184. In an illustrative embodiment, the status can be sent via a wireless access protocol (WAP).

Figure 2:
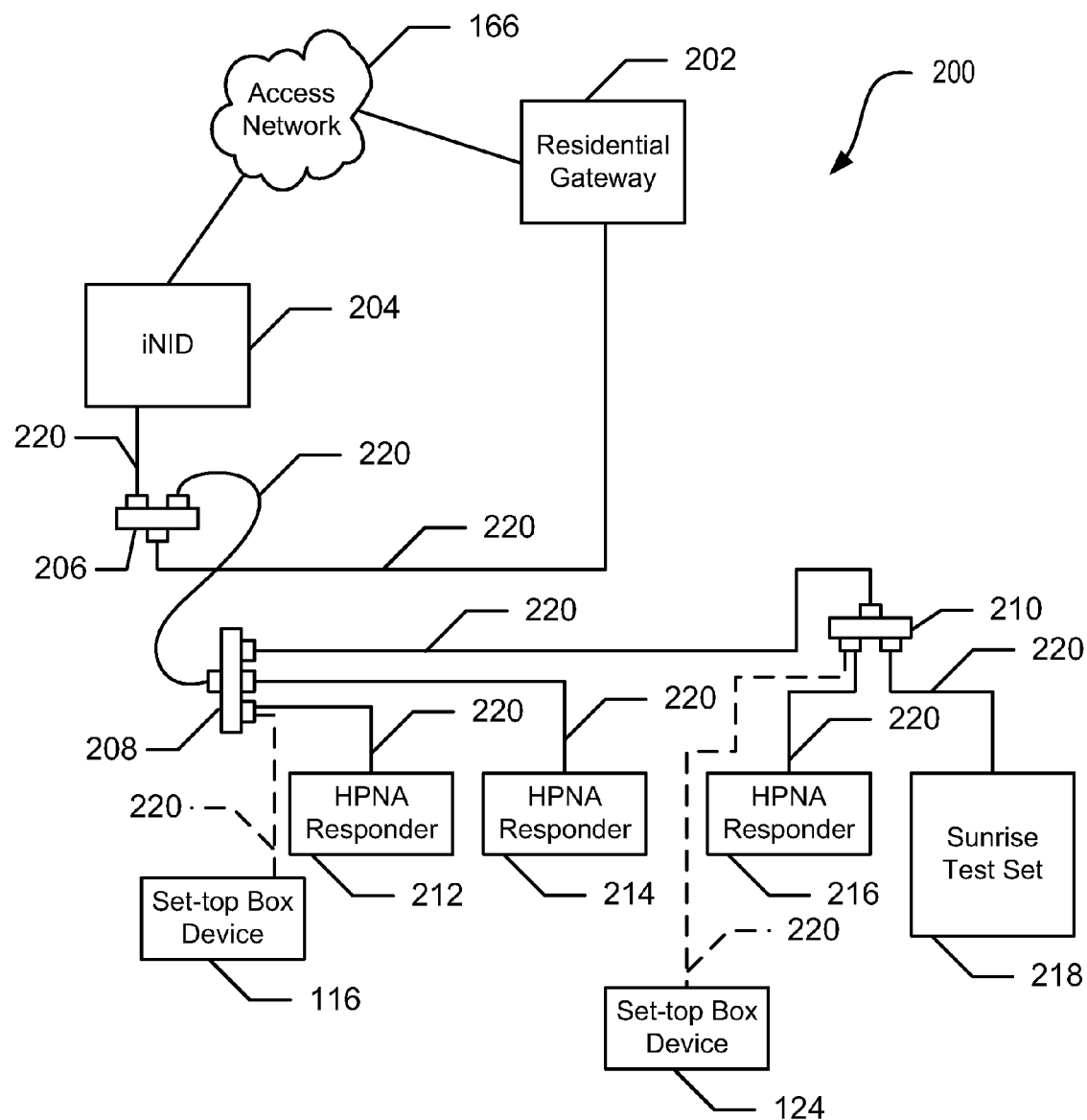
FIG. 2 is a block diagram of a local network connected to the IPTV network.

FIG. 2 shows a block diagram of a local network 200 connected to the access network 166 of the IPTV system 100. The local network 200 includes a residential gateway 202 or an intelligent network interface device (iNID) 204, a plurality of connectors 206, 208, and 210, a plurality of home phone-line network alliance (HPNA) responders 212, 214, and 214, and a HPNA test set 218. The residential gateway 202 or the iNID 204 are in communication with the access network 166 of the IPTV system 100. The HPNA responders 212 and 214 are connected to the connector 208. The HPNA responder 218 and the HPNA test set 218 are connected to the connector 210. The connector 208 is also connected to the connectors 206 and 210. A plurality of cables 220 connect the connectors 206, 208, and 210, the HPNA test set 218, and the HPNA responders 212, 214, and 216. The cables 220 can be coaxial cables, twisted pair cables, or the like.

The residential gateway 202 or the iNID 204 provide devices, such as the set-top box devices 116 and 124, with a single connection to the access network 166 of the IPTV system 100. The set-top box devices 116 and 124 can be connected to the local network 200 through one of the connectors 206, 208, or 210. The residential gateway 202 or the iNID 204 can receive data and video signals from the client facing tier 102 through the access network 166 and provide the signals to the set-top box devices 116 and 124. The connectors 206, 208, and 210 can provide a number of outlets for connecting either the set-top box devices 116 and 124, the HPNA responders 212, 214, and 216, and the HPNA test set 218 to the local network 200.

The HPNA test set 218 can be connected to the local network 200 to test the cables 200 and connections of the local network. The HPNA test set 218 can transmit a test signal over the local network 200 to the HPNA responders 212, 214, and 216. The test signal can be a configurable number of data packets for testing the HPNA performance of the local network 200. The HPNA performance can be used to determine whether the local network 200 is capable of transmitting signals that are compliant with HPNA specifications. The HPNA specifications provide transmission rates and frequency ranges for the transmission of signals in a network. Transmission rate is the number of bits transmitted per second in the network. In one embodiment, a personal computer can be used to perform the same functions as the HPNA test set 218.

The HPNA responders 212, 214, and 216 can be configured to receive the test signal from the HPNA test set 218 and to determine a signal quality and a transmission rate for the test signal. The signal quality is based on a number of packets lost, a signal-to-noise ratio, and a packet error rate for the test signal. The HPNA responders 212, 214, and 216 can also determine a Media Access Control (MAC) address for each HPNA responder. The MAC address is different for each HPNA responder 212, 214, and 216 and can be used to identify the location of the HPNA responders in the local network 200. Upon determining the signal quality and the transmission rate for the test signal, the HPNA responders 212, 214, and 216 transmit a performance result signal to the HPNA test set 218. The performance result signal includes the number of packets lost, the signal-to-noise ratio, the packet error rate, and the MAC address.

In one embodiment, the local system 200 can be a customer premises, such as a personal residence connected to the IPTV system 100 through the access network 116. Prior to the installation of the set-top box devices 116 and 124, the HPNA responders 212, 214, and 216 and the HPNA test set 218 can be used to test the HPNA performance of the local network 200. The HPNA responders 212, 214, and 216 and the HPNA test set 218 can test the HPNA performance of the local network 200 by simulating the transmission of IPTV signals between the set-top box devices 116 and 124 in the local network.

The transmission of the test signal from the HPNA test set 218 to the HPNA responders 212, 214, and 216 can be used to test a physical layer of the local network 200. The physical layer of a network provides transmission of a physical signal over a transmission medium, such as the cables 220 in the local network 200. Upon receiving the test signal, the HPNA responders 212, 214, and 216 can determine the transmission rate and the number of packets lost, if any, during the transmission of the test signal over the cables 220. The HPNA responders 212, 214, and 216 can also determine the signal-to-noise ratio, and the packet error rate for the test signal. The HPNA responders 212, 214, and 216 transmit the signal quality and the transmission rate to the HPNA test set 218. Based on the signal quality and the transmission rate, the HPNA test set 218 can determine whether the local network 200 and the cables 220 are capable of supporting the transmission of the IPTV signals of the IPTV system 100.

Figure 3:
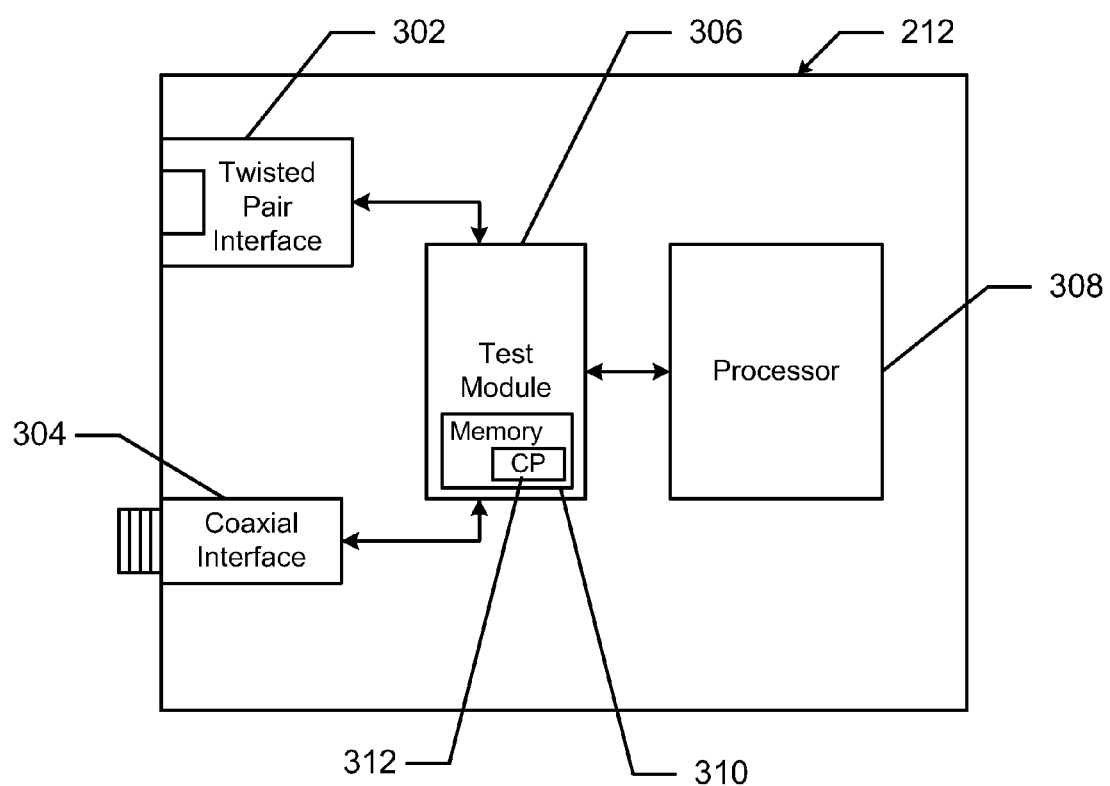
FIG. 3 is a block diagram of a Home Phoneline Network Alliance (HPNA) responder of the system of FIG. 2.

FIG. 3 shows the HPNA responder 212 including a twisted pair interface 302, a coaxial interface 304, a test module 306, and a processor 308. Depending on the type of cable 220 used in the local network 200, either the twisted pair interface 302 or the coaxial interface 304 connects the HPNA responder 212 to the local network. The twisted pair interface 306 allows the HPNA responder 212 to be connected to the local network 200 through a twisted pair cable, such as a telephone cable or a Cat5 Ethernet cable. The coaxial interface 308 allows the HPNA responder 212 to be connected to the local network 200 through a coaxial cable.

The test module 306 receives the test signal transmitted over the local network 200 through its communication with twisted pair interface 306 and the coaxial interface 308. The test module 306 includes a memory 310 and a computer program 312. The processor 308 is in communication with the test module 306 and can execute a set of instructions stored in the computer program 312 of the memory 310. The processor 308 uses the program instructions to run the HPNA performance test on the test signal received through either the twisted pair interface 302 or the coaxial interface 304.

Upon the HPNA responder 212 receiving the test signal, the test module 306 can store the test signal in the memory 310, and the processor 308 can execute the instructions of the computer program 312. Based on the instructions, the processor 308 can determine a signal quality and the transmission rate for the test signal. The processor 308 can also transmit the signal quality and the transmission rate to the HPNA test set 218, through the twisted pair interface 302 or the coaxial interface 304. The HPNA responders 214 and 216 can include the same components and perform the same functions as stated for the HPNA responder 212 above. Based on the signal qualities, the transmission rates, and the MAC addresses, the HPNA test set 218 can determine which cables 220 and connectors 206, 208, and 210, if any, need to be replaced before the local network 200 can support the IPTV signals.

Figure 4:
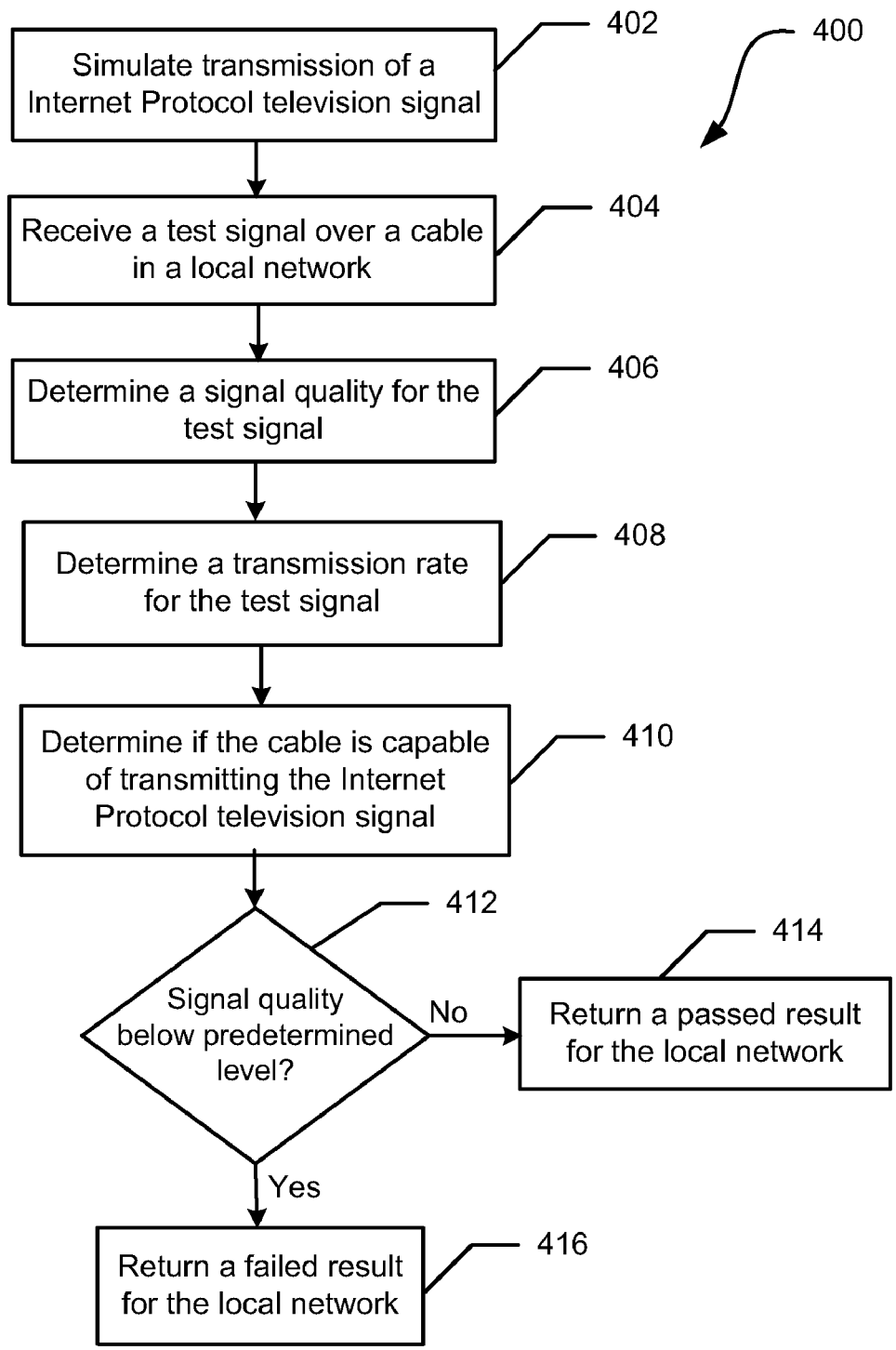
FIG. 4 is a flow diagram of a method for testing the local network shown in FIG. 2.

FIG. 4 shows a flow diagram of a method 400 for testing the HPNA performance for a local network. At block 402, transmission of an IPTV signal is simulated. At block 404, an HPNA responder receives a test signal over a cable of the local network. A HPNA test set or a personal computer can be used to transmit a configurable number of packets in the test signal. The HPNA responder determines a signal quality for the test signal received over the cable at block 406. The HPNA responder can determine the signal quality by determining the number of packets lost, a signal-to-noise ratio, and a packet error rate for the test signal. At block 408, the HPNA responder determines a transmission rate for the test signal over the cable. At block 410, the HPNA responder outputs a performance result signal based on the signal quality and the transmission rate for the test signal. The performance result signal can include the number of packets lost, the signal-to-noise ratio, the packet error rate, and the MAC address for the HPNA responder. The MAC address can be used to designate the HPNA responder that transmitted the performance result signal.

At block 412, based on the performance result signal the HPNA test set determines if the signal quality is below a predetermined level. At block 414, if the signal quality is not below the predetermined level, the HPNA test set returns a pass result for the local network. If the signal quality is below the predetermined level, the HPNA test set returns a fail result for the local network at block 416. The flow diagram can be repeated as stated above beginning with block 404 for every HPNA responder connected to the local network.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the FIGs. are to be regarded as illustrative rather than restrictive.

The Abstract of the Disclosure is provided to comply with 37 C.F.R. §1.72(b) and is submitted with the understanding that it will not be used to interpret or limit the scope or meaning of the claims. In addition, in the foregoing Detailed Description of the Drawings, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description of the Drawings, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosed subject matter. Thus, to the maximum extent allowed by law, the scope of the present disclosed subject matter is to be determined by the broadest permissible interpretation of the following claims and their equivalents, and shall not be restricted or limited by the foregoing detailed description.

What is claimed is:

1. A method for testing a home phoneline networking alliance (HPNA) performance of a local network, the method comprising:
   providing a test signal at a first network interface of the local network;
   receiving the test signal at an HPNA responder, the HPNA responder at a second network interface of the local network;
   determining at the HPNA responder a signal quality of the received test signal;
   providing a performance result signal at the second network interface, the performance result signal indicative of the signal quality; and
   receiving the performance result signal at the first network interface.

2. The method of claim 1 further comprising:
   determining a transmission rate for the test signal over the local network prior to outputting the performance result signal.

3. The method of claim 2 wherein the local network includes a cable, the type of cable is selected from a group consisting of a twisted pair cable and a coaxial cable.

4. The method of claim 1 wherein the signal quality is a signal to noise ratio for the test signal.

5. The method of claim 1 wherein the signal quality is a packet error rate for the test signal.

6. The method of claim 1 wherein the signal quality is a number of packets lost prior to receiving the test signal.

7. The method of claim 1 wherein the test signal is adapted to simulate an Internet Protocol television transmission in the local network.

8. A device for testing a home phoneline networking alliance (HPNA) performance of a local network, the device comprising:
   a test set adapted to connect to the local network at a first network interface, the test set operable to transmit a test signal and receive a performance result signal;
   an HPNA responder adapted to connect to the local network at a second network interface, the HPNA responder including:
      a test module operable to receive the test signal transmitted over a cable in the local network; and
      a processor connected to the test module, the processor operable to execute a plurality of program instructions, the plurality of program instructions comprising:
         instructions to determine a signal quality for the test signal received over the cable; and
         instructions to output the performance result signal for the cable in the local network, the performance result signal based on the signal quality.

9. The device of claim 8 further comprising:
   instructions to determine a transmission rate for the cable in the local network.

10. The device of claim 8 wherein the signal quality is a number of packets lost prior to receiving the test signal.

11. The device of claim 8 wherein the signal quality is a packet error rate for the test signal.

12. The device of claim 8 wherein the test signal is adapted to simulate transmission of an Internet Protocol television signal in the local network.

13. The device of claim 8 wherein the cable is a twisted pair cable.

14. The device of claim 8 wherein the cable is a coaxial cable.

* * * * *